United States Patent [19]

Park

[11] Patent Number: 5,465,596

[45] Date of Patent: Nov. 14, 1995

[54] KEY RING

[76] Inventor: James I. Park, 18511 Egret Bay No. 402, Houston, Tex. 77058

[21] Appl. No.: 373,563

[22] Filed: Jan. 17, 1995

[51] Int. Cl.$^6$ .................................................... A44B 15/00
[52] U.S. Cl. ............................ 70/458; 70/456 R; 24/3.6; 24/601.3
[58] Field of Search .................................. 70/456 R–459; 24/3.6, 546, 601.3, 698.3

[56] References Cited

U.S. PATENT DOCUMENTS

| | | | |
|---|---|---|---|
| 482,670 | 9/1892 | Ackerman | 24/3.6 X |
| 570,442 | 11/1896 | Adams | 70/456 R |
| 850,185 | 4/1907 | Roberts | 24/546 |
| 932,787 | 8/1909 | Kirby | 70/458 |
| 971,263 | 9/1910 | Gilmore | 70/456 R |
| 1,231,742 | 7/1917 | Hurlbut | 24/601.3 X |
| 1,462,205 | 7/1923 | Korns | 70/458 |
| 3,358,484 | 12/1967 | Le Page | 70/458 |
| 4,004,328 | 1/1977 | Bohn et al. | 24/601.3 |
| 4,951,361 | 8/1990 | Stephens, Jr. | 24/3.6 |
| 5,367,896 | 11/1994 | Sundberg | 70/458 X |

FOREIGN PATENT DOCUMENTS 6959 of 1886 United Kingdom .................... 70/458

Primary Examiner—Steven N. Meyers
Assistant Examiner—Suzanne L. Dino
Attorney, Agent, or Firm—Marvin J. Marnock

[57] ABSTRACT

A key ring 10 formed from a continuous piece of pliant spring wire 10 in a first unstressed configuration which comprises a large outer loop 14 having a free end portion 18 adapted to receive keys thereon. The unstressed configuration of the wire includes a smaller inner loop 16 of a size sufficient to receive one's finger therethrough and which loop 16 provides a first arcuate portion 20 in overlying relation to said free end portion 18 along its length. A second arcuate portion 22 extends from the inner loop and overlies the inner surface of the first arcuate 20 portion of the inner loop and provides therewith an external groove 24 adapted to receive the free end portion 18 of the outer loop which is easily manipulatable by one's fingers to be seated in the groove 24 and thereby place the key ring in a locked condition for retaining keys on the key ring. The free end portion 18 of the outer loop is also releasable from the locking groove 24 by use of one's fingers to squeeze the inner loop 16 towards a coaxial relation with the outer loop 14, whereby the free end portion snaps back to its original position and the key ring is returned to its unstressed configuration suitable for removal or placement of keys.

4 Claims, 2 Drawing Sheets

KEY RING

FIELD OF THE INVENTION

This invention relates to a key ring and more particularly to a key holder formed from a continuous length of spring wire in an unstressed configuration which permits easy manipulation by one's fingers to a second configuration wherein the key holder is in a locked condition for retaining keys on the key holder and is also easily manipulatable by one's fingers to release the key holder from its locked condition to facilitate the placement of keys thereon or the removal of keys therefrom.

BACKGROUND OF THE INVENTION

Key rings have been fashioned in an almost limitless number of designs of varying degrees of complexity. Most key rings are three-dimensional in configuration, frequently comprised of overlying loops in a uniform helical spiral which requires the use of one's finger nails or a tool other than the key itself to effect the separation of the loops for allowing the placement of a key on the ring or to permit its removal. Other key rings are provided with hinged clasps or multi-part locking mechanisms for accessing the key ring for placement or removal of keys which features add to the complexity of the ring and the costs of manufacturing. In addition, many conventional key rings have protruding parts and appendages which are prone to snag on the pockets or purses in which they may be carried.

SUMMARY OF THE INVENTION

The invention disclosed herein is a key ring formed from a continuous piece of pliant spring wire. The wire is formed in a first unstressed configuration which comprises a large outer loop having a free end portion adapted to receive keys thereon, each key having a hole for receiving the key ring wire therethrough. The unstressed configuration of the wire includes a smaller inner loop of a size sufficient to receive one's finger therethrough and which loop provides a first arcuate portion in overlying relation to said free end portion along its length. In addition, a second arcuate portion extends from the inner loop and is disposed in overlying relation to the first arcuate portion of the inner loop. The two arcuate portions provide an external groove which is adapted to receive the free end portion of the outer loop. The free end portion of the pliant outer loop is manipulatable by one's fingers to be seated in the groove and thereby place the key ring in a second configuration wherein the key ring is in locked condition for retaining keys on the key ring. The free end portion of the outer loop is also releasable from the locking groove by use of one's fingers to squeeze the inner loop towards a concentric relation with the outer loop, whereby the free end portion snaps back to its original position and the key ring is returned to its unstressed configuration.

DETAILED DESCRIPTION OF THE PREFERRED EMBODIMENT

Figure 1:
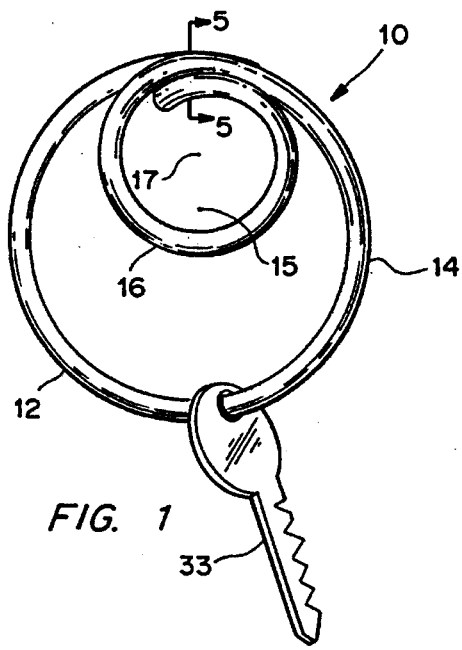
FIG. 1 is a top plan view of the key ring of the invention in its unstressed configuration wherein the key ring is in open condition and a key has been placed thereon.
Figure 2:
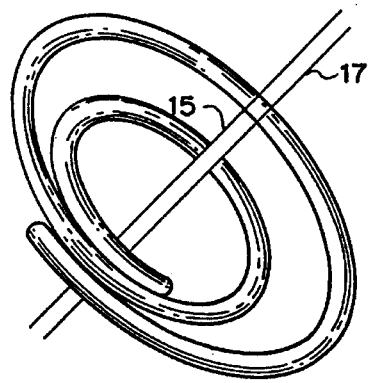
FIG. 2 is a perspective view of the key ring of the invention in its unstressed configuration.

Referring more particularly to the drawings, there is shown in FIGS. 1 and 2 a key ring 10 representing a preferred embodiment of the invention. The key ring 10 is formed from a single continuous length of pliant spring wire 12 in a first unstressed configuration comprising a succession of helical spirals, the first of which forms a large outer loop 14 about a first axis 15 and the second of which forms a smaller inner loop 16 about a second axis 17 in offset parallel relation to the first axis.

As shown in FIG. 2 the large loop 14 of the wire 12, which is of conventional circular cross section, has a free end portion 18 which is adapted to receive one or more keys thereon, each of which is provided with a hole for accommodating insertion of the free end portion 18 of the wire therethrough when the keys are to be mounted on the loop 14 of the key ring.

The inner loop 16 of the wire 12 includes a first arcuate portion 20 which overlies the arcuate free end portion 18. In the key ring 10, the arcuate portion 20 and free end portion 18 are in abutting relation to one another throughout their lengths, although a small spacing therebetween which is less than the thickness of the wire can be acceptable.

The wire 12 also includes a second arcuate portion 22 which continues and extends from the inner coil loop 16 as a terminated portion of an incompleted third coil of the wire 12. The second arcuate portion 22 is in abutting overlying relation to the arcuate portion 20 throughout its length and is a shorter radial distance from the axis 17 of the inner loop 16 than the arcuate portion 20. Accordingly, it will be seen that arcuate portion 22 engages the arcuate portion 20 along the upper inner surface thereof which faces the axis 17.

Figure 5:
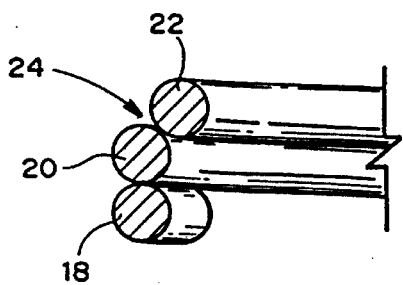
FIG. 5 is a fragmentary section view of the key ring of the invention as taken along the section line 5—5 in FIG. 1 and showing an external locking groove or depression formed by juxtaposed arcuate portions of the key ring.
Figure 6:
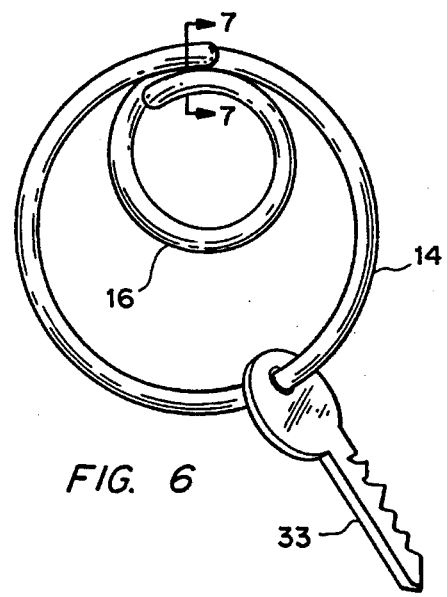
FIG. 6 is a top plan view similar to FIG. 1 but showing the key ring in locked condition for retaining a key thereon.
Figure 7:
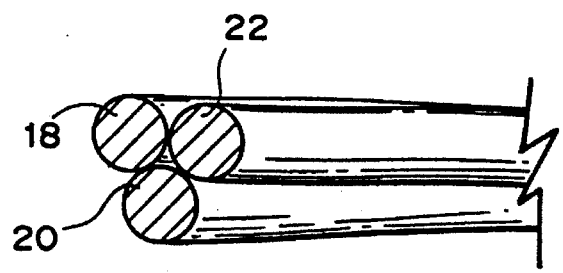
FIG. 7 is a fragmentary sectional view as taken along the section line 7—7 in FIG. 6 and showing the free end portion of the key-retaining outer loop of the key ring shifted to a releasable locked position where it is seated in the locking groove shown in FIG. 5.

As shown in FIG. 5, the juxtaposed arcuate portions 20, 22 of wire 12 provide an external groove or groove-like depression 24 in the periphery of the key ring, which groove is adapted to receive the free end portion 18 of the loop 14 such that the portion 18 is seated therein and supported by the arcuate portion 20. Because of the resiliency of the wire 12, it is possible to lift the free end portion 18 and shift it to its seated position in the groove-like depression 24 as shown in FIGS. 6 and 7 wherein the key-ring 10 is in a second configuration which effectively closes and locks the key ring and prevents dislodgement of keys such as the key 33 from the key ring.

Figure 8:
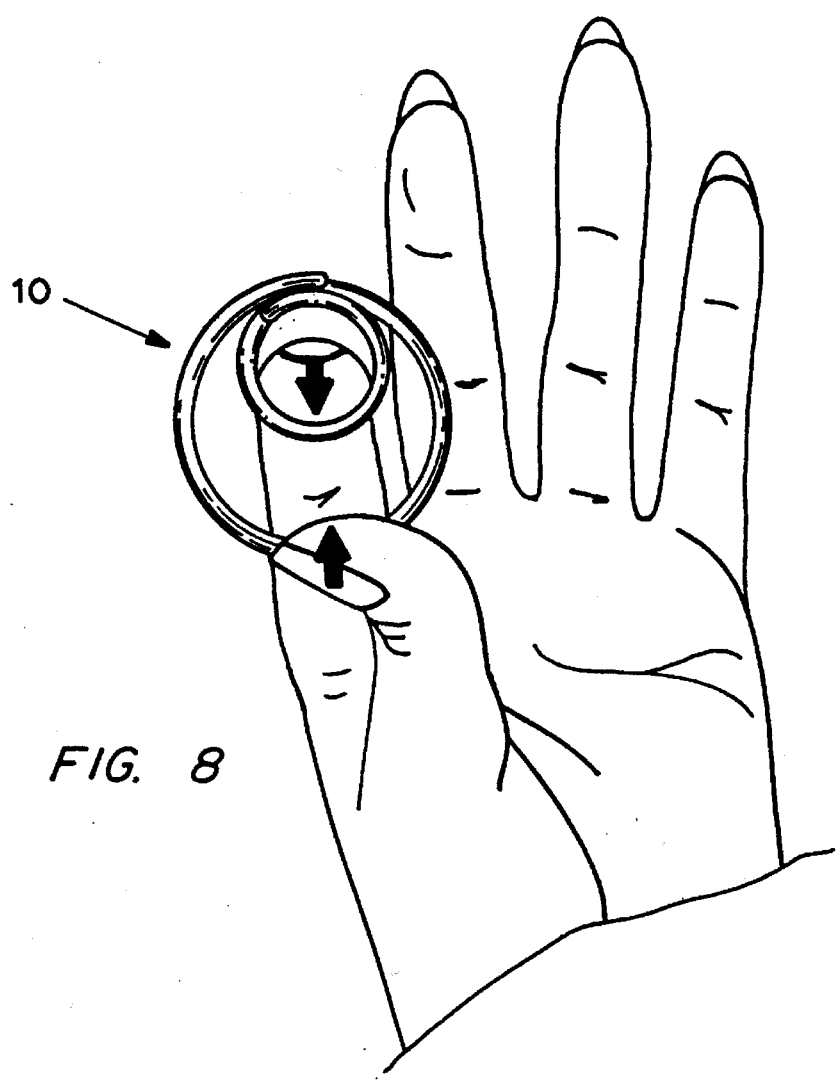
FIG. 8 is a top plan view of the key ring of FIG. 1 showing the inner spiral loop of the key ring being urged in a direction away from the free end portion of the outer loop by squeezing the inner and outer loops of the key ring between one's fingers whereby the free end portion of the outer loop will be freed from its locked condition and the key ring returned to its unstressed configuration.

Shifting of the free end portion 18 to its seated position in the depression 24 can be accomplished by using the index finger and thumb of only one hand such that the free end portion 18 is moved by the index finger upwardly about the exterior of the arcuate portion 20 to its seated position. However, as shown in FIG. 8, one may use both hands to facilitate the shift of the free end portion 18 into its seated position in the locking groove by inserting one's index finger in the inner loop 16 and by cooperative use of the thumb of the same hand on the peripheral edge of the outer loop 14, apply a squeezing action to urge the inner loop of wire towards a portion of the outer loop which is remote from its arcuate portion 20. The free end portion 18 may then be lifted with one's other hand to its locking position. In most instances, a squeezing action which moves the inner loop 16 in a direction towards a coaxial relationship with the outer loop 14 such as shown by arrows in FIG. 8, is most effective.

Figure 3:
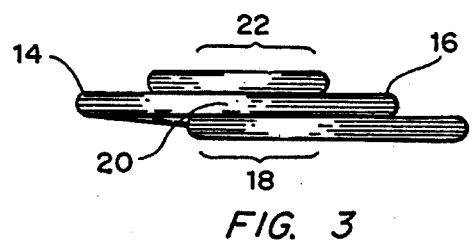
FIG. 3 is an enlarged side view of the key ring of FIG. 2.
Figure 4:
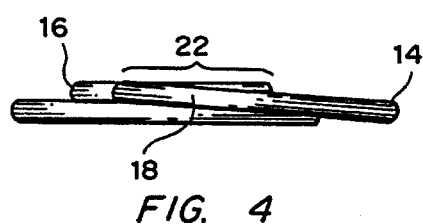
FIG. 4 is an enlarged side view of the key ring of FIG. 2 wherein the free end portion of the large outer loop of the key ring has been shifted to a position wherein the key ring is in a locked condition suitable for retaining keys thereon.

It is to be noted that the procedure illustrated in FIG. 8 is also appropriate for releasing the free end portion 18, which due to the resiliency of the wire 12 will snap back to its position as shown in FIGS. 3 and 5 as the loops 16 and 14 are moved towards a coaxial relationship and then released.

It is therefore to be appreciated that with the key ring of the present invention, the placing of one or more keys on the key ring is a relatively simple task. By a squeezing or pull-down action which moves the inner loop toward the center of the larger outer loop, the end of the wire at the free end portion of the outer loop is made accessible so that keys can be easily slipped thereon for placement on the remainder of the outer loop. Once the keys are placed on the outer loop, the free end portion of the outer loop may then be shifted to a seated position in the locking groove, thereby placing the key ring in a locked condition wherein the keys are secured on the key ring. By the squeezing action applied to the spiral loops by the fingers of one's hand, the frustrating necessity of using a tool or one's finger nails to pry open the coils of a key ring for placing keys or removing keys is eliminated.

While the foregoing description of the invention has been presented for purposes of illustration and explanation, it is to be understood that it is not intended to limit the invention to the precise form disclosed. For, example, the ends of the wire might be rounded or beaded and the wire material might be other than spring wire. It is to be appreciated therefore, that structural changes may be made by those skilled in the art without departing from the spirit of the invention.

I claim:

1. A key ring formed from a continuous length of pliant spring wire of circular transverse cross section in a first configuration comprising:

a first helical spiral about a first axis forming a single coil defining a large outer loop of said key ring, said outer loop having a free end portion adapted to receive a key which has a wire accommodating hole therein whereby a plurality of keys may be mounted on said outer wire loop;

a second helical spiral continuing from said large outer loop and formed about a second axis within said large outer loop in substantially parallel relation to said first axis wherein said second helical spiral forms a first coil defining a smaller inner loop having a first arcuate locking portion thereof in overlying abutting relation to the free end portion of said large outer loop along the length thereof, said second helical spiral further including a second arcuate locking portion continuing from said inner coiled loop in overlying abutting relation to the upper inner surface of said first arcuate locking portion along the length thereof, said arcuate locking portions of wire forming an external locking groove adapted to receive the free end portion of said outer loop of wire which by the pliancy of said wire is adapted to be placed and seated in said groove and thereby reform said wire in a second configuration for lockingly retaining keys on said outer loop, said free end portion being readily releasable from said locking groove by squeezing said inner wire loop toward a portion of the outer wire loop which is remote from said free end portion to thereby facilitate removal of keys from said key ring.

2. A key ring formed from a continuous length of pliant wire-like material in a first configuration comprising:

a first outer loop having a free end portion, a second smaller inner loop continuing from said first loop in eccentric relation thereto and including a first arcuate locking portion, and a second arcuate locking portion continuing from said smaller inner loop, said first arcuate locking portion disposed in overlying proximate relation to said free end portion along the length thereof and said second arcuate locking portion disposed in proximate relation to the upper inner surface of said first arcuate locking portion along the length thereof to define therewith an external groove-like depression which is arcuate in length and adapted to receive the free end portion of said outer loop of wire in locking engagement therewith, said free end portion being readily adaptable to receive keys thereon which have key ring accommodating holes and being placeable in said groove-like depression by resilient bending of said pliant material to a second configuration which places said key ring in a locked condition, said free end portion being releasable from said groove-like depression by use of one's fingers to compress said inner loop towards a concentric relation with said outer loop to allow the free end portion to return the wire to said first configuration.

3. A key ring as set forth in claim 2 wherein said overlying first and second arcuate locking portions of said wire are disposed in abutting relation to each other throughout their lengths.

4. A key ring formed from a continuous length of pliant wire material in a configuration wherein said key ring is in an open condition suitable for the placement of keys thereon, said configuration comprising:

a first outer loop having a free end portion;

a second smaller inner loop continuing from said first loop in eccentric relation thereto and including a first arcuate locking portion;

a second arcuate locking portion continuing from said smaller inner loop, said first arcuate locking portion being disposed in the open configuration of said key ring in overlying proximate relation to said free end portion along the length thereof and said second arcuate locking portion disposed in proximate relation to the inner surface of said first arcuate locking portion along the length thereof to define therewith an external locking groove which is arcuate in length and adapted to receive the free end portion of said outer loop of wire in locking engagement therewith, said free end portion being readily adaptable to receive keys thereon which have key ring accommodating holes and being shiftable to said locking groove to place said key ring in a closed locked configuration by resilient bending of said pliant material.

\* \* \* \* \*